United States Patent [19]

Besik

[11] 4,190,539
[45] Feb. 26, 1980

[54] APPARATUS FOR ON-SITE RENOVATION OF SANITARY WATERS

[76] Inventor: Ferdinand Besik, 3243 Chokecherry Crs., Mississauga, Ontario, Canada, L5L 1B1

[21] Appl. No.: 934,255

[22] Filed: Aug. 16, 1978

[51] Int. Cl.² ............................................. C02C 1/08
[52] U.S. Cl. ............................... 210/195.4; 210/202; 210/206; 210/521
[58] Field of Search .............................. 210/3–5, 210/7, 8, 14–16, 9, 18, 195 S, 195 R, 199, 200–202, 205–208, 219, 220, 197, 252, 521, 522

[56] References Cited

U.S. PATENT DOCUMENTS

| 3,419,146 | 12/1968 | Koulovatos | 210/202 |
| 3,460,677 | 8/1969 | Fifer | 210/521 |
| 3,764,011 | 10/1973 | Owens | 210/197 |
| 3,878,101 | 4/1975 | Kennedy | 210/202 |
| 3,997,444 | 12/1976 | McGivern | 210/521 |
| 4,100,070 | 7/1978 | White et al. | 210/202 |

Primary Examiner—Benoit Castel

[57] ABSTRACT

A self-contained apparatus for on-site renovation of sanitary waters comprises of three bioreaction chambers, a mineral storage and dispensing container, a submerged suspended solids separator located in the third bioreaction chamber, a flow equalizer, a chemical oxidizing agent dispensing system, a chemical oxidation-clarification chamber and a charcoal containing chamber, all enclosed in a single tank designed for use as on-site single or multiple family waste water renovation system.

6 Claims, 1 Drawing Figure

APPARATUS FOR ON-SITE RENOVATION OF SANITARY WATERS

This invention relates to an apparatus for on-site renovation of sanitary waters and has for its object a provision of an improved apparatus capable of unattended an reliable operation when purifying sanitary waters to a high quality effluent suitable for limited reuse.

BACKGROUND TO THE INVENTION

It has become evident that nitrogen and phosphorus affect the productivity of aquatic life—nitrogen being the limiting nutrient in eutrophic waters and phosphorus in oligotrophic waters.

It is also known that domestic waste waters contain from 10 to 100 times the nutrient concentration of agricultural or forest drainage. Consequently in densely populated areas overfertilization of surface waters, algae growth and chemical pollution have been noticed along with degradation of potable water sources and the need for more efficient removal of all pollutants from waste waters has become more obvious.

While removal of phosphorus can be achieved reliably by chemical precipitation and removal of organics by biological followed by physical-chemical processes, removal of nitrogen is more complicated.

The biological transformations of nitrogenous compounds occur through biological processes of ammonification, nitrification and denitrification. The first two require presence of oxygen, the denitrification require absence of oxygen. The two distinct mechanisms responsible for removal of nitrogen and reduction of nitrite and nitrate are (a)—formation of ammonia followed by transfer of ammonia into the anabolic cell metabolism which is of minor importance since C:N ratio in cell tissue is 5-6, whereas in domestic waste waters only 2 to 2.5 (b)—microbial denitrification, which is a respiratory reduction in which nitrite and nitrate replace oxygen as the final electron acceptors in the respiration chain.

Biooxidation of organic matter, ammonification and nitrification cause no problem. Nitrification is efficient and reliable if organic loadings are maintained below 0.3 lb BOD per lb of mixed liquor suspended solids per day, sludge age is maintained above 3-4 days and disolved oxygen in the mixed liquor is maintained above 1.0-2.0 mg/lit. The higher is the concentration of mixed liquor suspended solids, the more efficient is the transformation of ammonia to nitrite and nitrate. The overall rate of denitrification is a function of the concentration of the heterotrophic facultative bacteria present in mixed liquor suspended solids and their activity in the absence of oxygen. To maintain the activity the denitrifying bacteria must be supplied with suitable organic material—source of energy.

From the process point of view to accomodate the different food and oxygen requirements of biooxidation of organic matter, ammonification and nitrification of nitrogenous compounds and decomposition of nitrite and nitrate by microbial respiration and to achieve acceptable reaction rates and efficiencies, the various biochemical reactions are currently being carried out in separate process stages. While the conventional activated sludge process is capable of removing nitrogen with efficiency of 50-60 percent, the current multistage processes can achieve the removal of nitrogen with efficiency of up to 80-90 percent.

The multistage processes currently in use in large municipal treatment plants require treatment facilities that are too complex to be scaled down to small package plants to serve small developments or single family dwellings. Because of the number of process steps required for removal of the various pollutants renovation and reuse of domestic waste waters at present seems feasible only if practiced on a large scale.

A large waste water treatment-renovation plant however requires large underground sewage collection-transportation network, and in case the renovated water is to be reused also a large underground water distribution network. Such networks are expensive to build and even more expensive to maintain and to operate.

It is therefore obvious that on-site renovation and reuse of waste water would be economically more attractive than renovation and reuse of waste waters via central collection-treatment-distribution. However because of the complexity of the involved treatment on-site renovation and reuse of domestic waste waters as yet can't be practiced.

Although at present small package sewage treatment plants are available, they do not provide the required degree of purification that would permit reuse of the purified effluent and in general they also lack the required mechanical reliability.

It is therefore the prime object of this invention to provide an apparatus in which the various processes to remove all pollutants present in sanitary waters could be carried out reliably, unattended and at acceptable cost when serving single or multiple family dwellings.

More particularly it is the object of this invention to provide an apparatus that would reliably maintain all conditions required for efficient biooxidation of organic matter, biological nitrification, biological denitrification, chemical precipitation of soluble phosphates, chemical oxidation of the residual and refractory organics and toxic compounds, efficient kill of bacteria and viruses and efficient removal of the residual chemical oxidizing agents so as to render the effluent non-toxic to aquatic life and suitable for reuse.

Another object of this invention is to provide an inexpensive and reliable apparatus for storing and proportioning of the various chemicals to the unsteady or batchwise flow of the incoming waste water.

Another object of this invention is to provide an apparatus in which efficient separation of suspended solids from the effluent is achieved inside the reactor so that a separate clarifier and the associated sludge return pumping is not required.

Another object of this invention is to provide an apparatus capable of reliable and unattended operation when processing waste waters on ships under condition of ship motion and vibration.

Another object of the invention is to provide an improved suspended solids separator that would not be affected by "sloshing" that normally occurs on ships during heavy roll and pitch conditions.

Another object of this invention is to provide an apparatus that would require only once per year replenishment of the used chemicals and only once per year withdrawal of the excess sludge when serving single family or multiple family dwellings.

It is also an object of this invention to provide an apparatus capable of reliable and unattented operation when operating with wood particles such as saw dust, powdered minerals, powdered activated carbon, powdered charcoal or their mixtures in reaction chambers.

Another object of the invention is to provide an apparatus that would be easy to scale up or down to use as standardised waste water renovation system to serve small communities, camps, airports, commercial developments, recreation centers, parks and industrial plants either as a permanent or temporary installations.

Other objects and features of the invention will be seth forth fully hereinafter.

The full nature of the invention will be understood from the accompanying drawing and the following description of claims.

SUMMARY OF THE INVENTION

The present invention provides an apparatus permitting the various biological, chemical and physical processes required to remove the various pollutants from raw sanitary waste water to be carried out within a single tank.

The tank is divided by partitions into three bioreaction chambers and two chemical reaction chambers and in a prefered embodiment the tank is made of steel and equipped with manways permitting entrance into each individual chamber.

The tank may be located below or above the ground when serving single or multiple family dwellings or installed on ships as a marine sanitation device.

The first bioreaction chamber contains a suspension of processed waste water, nonbiodegradable suspended solids and mixed microbial population, the suspension being recirculated with the first reaction chamber by a mechanical mixer without addition of oxygen.

The second bioreaction chamber contains a suspension of partially processed waste water, nonbiodegradable suspended solids and mixed microbial population, the suspension being recirculated in this chamber by a mechanical mixer which simultaneously injects into the suspension atmospheric air to keep the liquid in this chamber saturated with oxygen.

The third bioreaction chamber contains a submerged multichannel suspended solids separator and the suspension containing purified waste water, nonbiodegradable suspended solids and mixed microbial population in this chamber is recirculated over and under the multichannel suspended solids separator to maintain the suspended solids in suspension and to enhance flocculation. The recirculation of the suspension in this chamber is by mechanical mixer without addition of oxygen.

The fourth reaction chamber is a chemical oxidation-clarification chamber and contains a submerged multichannel chemical reactor to prevent shortcutting of the chemically treated effluent within the fourth reaction chamber, to provide the required contact time for chemical oxidation of the residual organics and/or toxic chemicals, to provide the required contact time for efficient kill of bacteria and viruses and to simultaneously separate the formed precipitate and the residual suspended solids from the chemically purified effluent.

The fifth reaction chamber is for final polishing of the purified waste water and contains charcoal or activated carbon to decompose the residual oxidizing agents and to render the effluent nontoxic to aquatic life and suitable for reuse.

The dosage of the various chemical agents is by dissolution of granulated chemicals into the recirculated liquor, the level of which is rising in bioreaction chambers when the waste water is fed into the system and then slowly falling to normal operating level when there is no flow of the incoming waste water.

DETAILED DESCRIPTION OF THE APPARATUS

Figure 1:
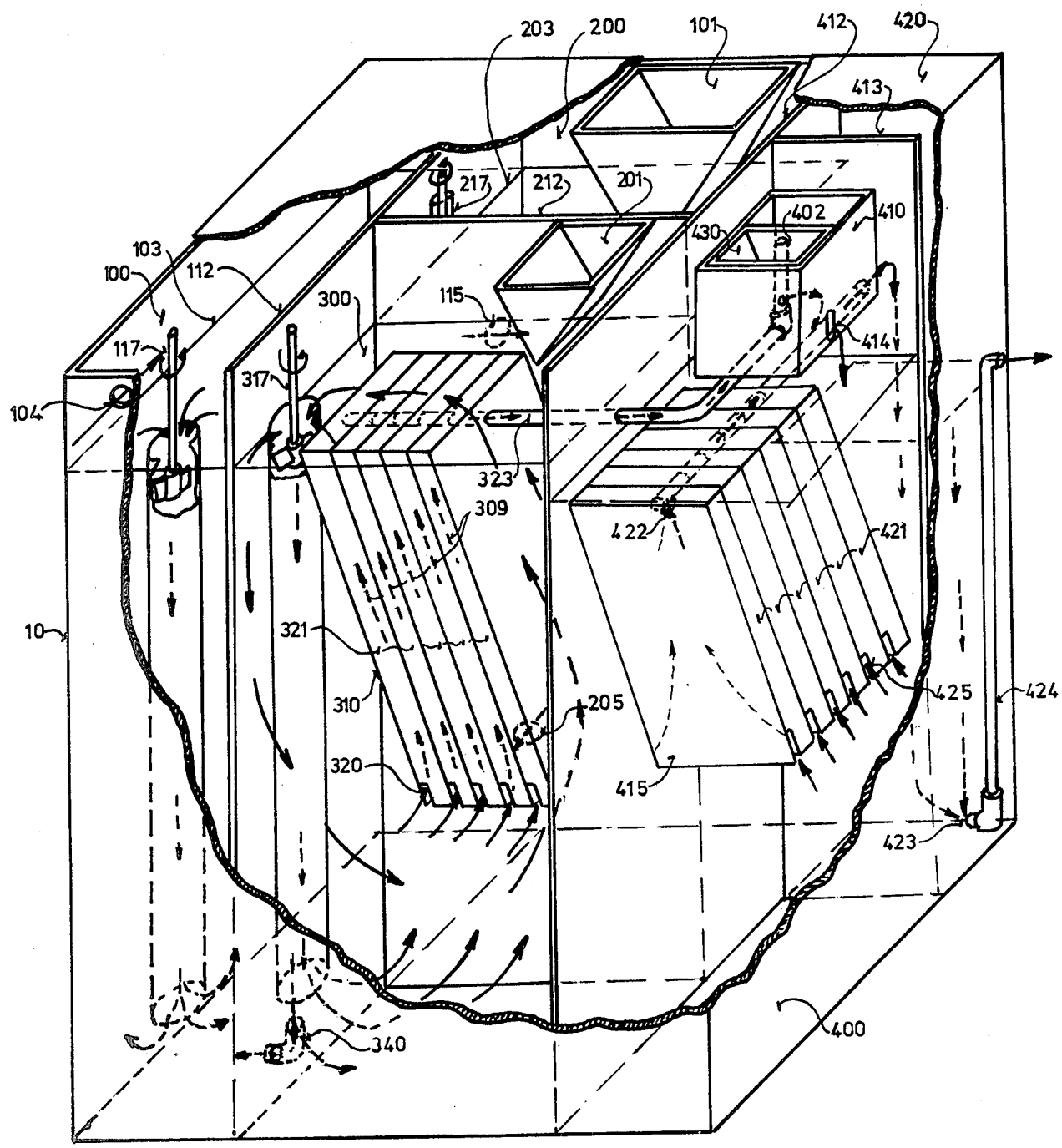
FIG. 1 is an overall view through a preferred embodiment of the apparatus of the present invention.

A cut away prespective view of the complete apparatus of the present invention is shown in FIG. 1. The apparatus comprises of first bioreaction chamber 100 formed by partition 112 and the outside walls and the floor of the tank 10 and equipped with a submerged mechanical mixer 117 and containing a suspension of purified waste water, nonbiodegradable suspended solids and mixed microbial population 103; the second bioreaction chamber 200 formed by partitions 112, 212 and 412 and one outside wall and floor of the tank 10 and equipped with a submerged mechanical mixer with an air injector 217 and containing a suspension of purified waste water, nonbiodegradable suspended solids and mixed microbial population; the third bioreaction chamber 300 formed by partitions 112, 212, 412 and the second outside wall and floor of the tank 10 and equipped with a submerged mechanical mixer 317 and a submerged multichannel suspended solids separator 310; the flow equalizer 402; a chemical oxidizing agent storage-dispensing chamber 410; a mineral storage-dispensing container 101; an organic material storage-dispensing container 201; chemical oxidation-clarification chamber 400 formed by partitions 412 and 413 and the side walls and floor of the tank 10 and equipped with a submerged multichannel reactor 415; and polishing chamber 420 containing charcoal or activated carbon formed by partitions 412, 413 and the side walls and floor of the tank 10.

Refering to the system's hydraulics, at periods of zero flow of the incoming waste water the height of the suspension in the first 100, second 200 and third 300 bioreaction chambers is at 103, 203 and 303 levels with the suspension containing waste water nonbiodegradable suspended solids and mixed microbial population being continuously recirculated within the three bioreaction chambers by submerged mechanical mixers 117, 217 and 317 without injection of atmospheric air into suspension in chambers 100 and 300 and with injection of the atmospheric air into the suspension in chamber 200 the suspension being also continuously circulated from the third bioreaction chamber 300 via channel 340 located in partition 112 into the first bioreaction chamber 100, from first bioreaction chamber 100 via a screened opening 115 in partition 112 into the second bioreaction chamber 200 and from second bioreaction chamber 200 via restricted opening 205 in partition 212 back into third bioreaction chamber 300.

Under conditions of zero flow of the incoming waste water the mineral storage dispensing container 101 located in second bioreaction chamber 200 and the organic material storage dispensing container 201 located in third bioreaction chamber 300 are just above the liquid levels 203, 303, the mineral and the organic material not being in contact with the recirculated suspension maintained in bioreaction chambers 200 and 300 and therefore not being disolved into the recirculated liquid. As the waste water enters via opening 104 into first bioreaction chamber 100 the liquid level in first, second and third bioreaction chambers rises, the increase in the height of the recirculated suspension being proportional to the difference between the flow of incoming waste water and flow of the clarified waste water from the flow eqalizer 402. The higher the flow rate of the incoming waste water the higher is the liquid level in the three bioreaction chambers and consequently more of the mineral and the organic material is submerged into the recirculated suspension and disolved.

As the incoming waste water is mixed in the first bioreaction chamber 100 with the suspension containing purified waste water, nonbiodegradable suspended solids and mixed microbial population the activity of the mixed microbial population rises and the nitrite and/or nitrate present in the suspension are removed by respiration of the mixed microbial population. At the same time portion of the organic matter from the waste water is biooxidized, portion of organic matter is adsorbed on the nonbiodegradable suspended solids and the nitrogenous compounds transformed to ammonia. The suspension containing partially purified waste water, suspended solids and mixed microbial population then flows from first bioreaction chamber 100 via screened opening 115 located in partition 112 into second bioreaction chamber 200 to be mixed with diffused air supplied by mechanical mixer 217, mixed microbial population nonbiodegradable suspended solids and mineral disolved into the recirculated suspension to precipitate phosphates. Enough contact time is provided in second bioreaction chamber 200 to completely biooxidise the disolved biodegradable organic matter and to transform the ammonia present in the waste water to nitrite and/or nitrate and a portion of nitrite and/or nitrate to nitrogenous gas and to precipitate phosphates.

The suspension containing the treated waste water, the remainning nitrite and/or nitrate , suspended solids and mixed microbial population is then flown from second bioreaction chamber 200 through restricted opening 205 located in partition 212 into third bioreaction chamber 300 to be mixed with the suspension present in bioreaction chamber 300 and containing nondegradable suspended solids, mixed microbial population and zero disolved oxygen in the liquid, the suspension being continuously recirculated by a submerged mechanical mixer 317. The activity of the mixed microbial population in third bioreaction chamber 300 is maintained by suspended organic matter and by soluble organic matter absorbed on nonbiodegradable suspended solids present in this chamber and by the added soluble organic material and by the nitrite and/or nitrate entering into bioreaction chamber 300 from bioreaction chamber 200. Due to the activity of the mixed microbial population present in third bioreaction chamber 300 in the absence of disolved oxygen, the remaining disolved biodegradable organic matter is biooxidised with the nitrite and/or nitrate being transformed by the respiration of the mixed microbial population to nitrogen gas. The mixture of purified waste water and suspended solids then enters into the submerged multichannel suspended solids separator 310 via openings 320 located at the lower end of the separator 310, then flows upward in channels 321 in direction of arrows 309, then into a centrally located collection line 323 and out of bioreaction chamber 300 into flow equalizer 402 located in chamber 410. On the way up in channels 321 suspended solids are settled out on the walls of the inclined channels, then continuously slid down into the recirculated liquor. The separated suspended solids are circulated in the third bioreaction chamber downwardly in the space formed between partition 112 and the wall of the suspended solids separator 310 and upwardly in the space formed between partition 412 and the other wall of the suspended solids separator 310. Portion of the separated suspended solids is continuously recycled into bioreaction chamber 100 via channel 340 located in partition 112.

The flow equalizer 402 located in the chemical oxidizing agent dispensing chamber 410 consists of a vertical pipe with a narrow opening 403. The flow equalizer maintains the flow of the processed waste water through the three bioreaction chambers and through the suspended solids separator within the designed range by means of the opening 403 and relatively independent of the flow of the incoming waste water. At a surge flow of the incoming waste water the flow equalizer causes to rise the liquid level in bioreaction chambers 100, 200, 300 to a level which is limited only by the height of equalizer pipe 402, accumulating the surge of the waste water in bioreaction chambers and then slowly at relatively constant rate releasing the processed waste water through the submerged suspended solids separator via opening 403 into chemical oxidizing agent dispensing chamber 410. In this way the detrimental effects of the surge of the incoming waste water on the involved biological processes and on the separation of suspended solids is eliminated.

The clarified effluent containing the residual refractory organics, bacteria and viruses and residual suspended solids overflows from opening 403 of the flow equalizer 402 into the chemical oxidizing agent dispensing chamber 410. To flow out from chamber 410 the effluent must pass through a narrow opening 414 in one wall of chamber 410 which controls the flowrate out of chamber 410 into the chemical oxidation—clarification chamber 400. At the varying flow of the effluent from the flow equalizer 402 the level of the liquid in chamber 410 rises and varies within the hight of the opening 414. A mixture of granulated chemical oxidizing agents is stored in perforated container 430 located in chamber 410 with the container's bottom touching the level of the liquid in chamber 410 at zero flow of the effluent through flow equalizer 402. The liquid level in chamber 410 rises proportionally to the flow rate of the effluent from this chamber submerging the perforated container 430 containing chemical oxidizing agents into the liquid and disolving the oxidizing agents into the effluent proportionally to the flow of the effluent through chamber 410. Thus the amount of chemical oxidizing agents disolved into a unit volume of the effluent in the apparatus of this invention is constant and is controled by the dimensions of the opening 414.

The effluent containing disolved chemical oxidizing agents then flows into the lower portion of the chemical oxidation-clarification chamber 400 and via opening 425 into a submerged multichannel reactor 410. The multichannel reactor prevents shortcutting of the chemically oxidized effluent within the chemical oxidation-clarification chamber thus providing conditions for efficient oxidation of the residual impurities, efficient kill of bacteria and viruses and simultaneously also efficient removal of the formed precipitate and residual suspended solids entrained from the third bioreaction chamber. In channels 421 the chemically oxidized effluent flows upwardly into a centrally located collection line 422 and then out of chamber 400 into chamber 420 for final purification and decomposition of the remaining oxidizing agents. In chamber 420 the purified effluent flows by gravity through a bed of charcoal, then via opening 423 and pipe 424 out of the apparatus for surface disposal or for reuse.

While the described apparatus is particularly useful for standardized single or multiple family waste water renovation units, or as a marine sanitation device, it has application to sewage treatment systems and sewage renovation systems of various sizes. It is particularly useful as a standardized package plant for use on land or off shore in various permanent or temporary installations.

While the apparatus of the present invention has been described for use with steel, it is obvious, that the apparatus may be constructed of any convenient material such as reinforced concrete or fiber glass.

Although the present invention has been described in part with reference to specific example, modifications may be constructed or used without departing from the scope of the invention which is defined in the following claims.

I claim:

1. A self contained apparatus for renovation of sanitary waters comprising a waste water receiving tank divided by common partitions into three bioreaction chambers, means for flowing waste water into the first bioreaction chamber, said bioreaction chambers being in communication via restricted openings in said common partitions for flowing the waste water by gravity from chamber to chamber in the direction from first chamber into the third chamber, said bioreaction chambers being also equipped wih an opening in said common partitions for recirculating a portion of the content from said third bioreaction chamber, will all bioreaction chambers being equipped with submerged mechanical mixers for recirculating, mixing and aerating the contents therein to maintain optimum process conditions, said third bioreaction chamber in addition being equipped with a suspended solids separator for separation of suspended solids from the thusly treated waste water and for retaining the separated suspended solids in said third bioreaction chamber, said suspended solids separator being composed of number of parallel settling channels completely submerged in the content in said third bioreaction chamber, said settling channels each being equipped with an opening located in the side wall at the bottom of the chamber and a restricted opening at the top for flowing the treated waste water upwardly through said settling channels and out through said restricted opening into a horizontally positioned effluent collection pipe, means for chemical treatment, a purification chamber and an exit pipe for discharge of treated effluent out of the apparatus.

2. An apparatus according to claim 1 wherein the effluent collection pipe is equipped with flow equalization means for controlling the flow rate of the treated waste water through said settling channels, chemical treatment means, and out of the apparatus.

3. An apparatus according to claim 2 in which the chemical treatment means comprise a chemical oxidizing chamber formed by the waste water receiving tank walls and common partitions between said chemical oxidizing chamber and bioreaction chambers, said chemical oxidizing chamber providing the required time for chemical oxidation of the impurities present in the treated waste water, including a chemical agent dissolving chamber for dissolving the chemical oxidizing agent into the treated waste water, said chemical agent dissolving chamber equipped with an inlet and an outlet inside wall causing the level of the liquid therein to rise in proportion to the flow of the treated effluent and in addition equipped with a container for storing and dissolving chemical oxidizing agent into the treated effluent flowing by gravity from the flow equalization means through said chemical agent dissolving chamber into said chemical oxidizing chamber.

4. An apparatus according to claim 3 in which in addition the chemical oxidizing chamber is equipped with means to prevent shortcutting of the chemically treated effluent with the chemical oxidizing chamber.

5. An apparatus according to claim 3 wherein the purification chamber contains charcoal for removing the remaining chemical oxidizing agent by reaction therewith, said purification chamber being formed by the tank walls, and common partitions between chemical oxidizing chamber, bioreaction chambers and said purification chamber, said charcoal being granulated and being retained in a fixed bed in said purification chamber and the treated effluent being flown by gravity through said charcoal into said exit pipe and out of the apparatus.

6. An apparatus according to claim 1 and comprising in addition a container located in one bioreaction chamber for storing and dissolving a slow dissolving granulated mineral or a mixture of granulated minerals into the treated waste water to precipitate soluble phosphates therefrom, said mineral being dissolved into the treated waste water in proportion to the incoming waste water automatically.

* * * * *